(12) United States Patent
Nunally (10) Patent No.: US 8,315,619 B1
(45) Date of Patent: Nov. 20, 2012

(54) SYSTEM AND METHOD FOR MANAGING MOBILE COMMUNICATIONS

(75) Inventor: Patrick Nunally, San Diego, CA (US)

(73) Assignee: e.Digital Corporation, San Diego, CA (US)

( * ) Notice: Subject to any disclaimer, the term of this patent is extended or adjusted under 35 U.S.C. 154(b) by 0 days.

(21) Appl. No.: 13/047,420

(22) Filed: Mar. 14, 2011

Related U.S. Application Data (63) Continuation of application No. 12/891,875, filed on Sep. 28, 2010.

(51) Int. Cl.
*H04M 3/00* (2006.01)

(52) U.S. Cl. ............... 455/418; 455/414.2; 455/425; 709/219

(58) Field of Classification Search .......... 455/418, 455/414.2, 425
See application file for complete search history.

(56) References Cited

U.S. PATENT DOCUMENTS

| | | | | |
|---|---|---|---|---|
| 7,593,740 | B2 * | 9/2009 | Crowley et al. | 455/456.3 |
| 7,620,212 | B1 * | 11/2009 | Allen et al. | 382/115 |
| 7,809,805 | B2 * | 10/2010 | Stremel et al. | 709/219 |
| 2008/0291024 | A1 * | 11/2008 | Zhang et al. | 340/572.1 |
| 2010/0056872 | A1 * | 3/2010 | Kahn et al. | 600/300 |
| 2011/0273378 | A1 * | 11/2011 | Alameh et al. | 345/173 |

OTHER PUBLICATIONS

Facebook Help Center page on Places. http://www.facebook.com/help?page=1080. Retrieved on Sep. 28, 2010.
Ketabdar, Hamed, "Using Mobile Phones for Monitoring Physical Conditions", Quality and Usability Lab, Deutsche Telekom Laboratories, Berlin, 3 pages.
U.S. Appl. No. 12/891,875, filed Sep. 28, 2010, Patrick Nunally.
U.S. Appl. No. 13/047,163, filed Mar. 14, 2011, Patrick Nunally.
U.S. Appl. No. 13/047,206, filed Mar. 14, 2011, Patrick Nunally.
U.S. Appl. No. 13/047,290, filed Mar. 14, 2011, Patrick Nunally.
U.S. Appl. No. 13/047,306, filed Mar. 14, 2011, Patrick Nunally.

* cited by examiner

*Primary Examiner* — Wayne Cai
*Assistant Examiner* — Chuck Huynh
(74) *Attorney, Agent, or Firm* — Stein McEwen, LLP

(57) ABSTRACT

A device to automatically provide differing information levels according to a predetermined social hierarchy includes a memory and a processor. The memory stores social templates corresponding to unique social signatures and being selectable to provide, for each level of the predetermined social hierarchy, a corresponding differing amount of information to each member of the predetermined social hierarchy and/or a social networking service. The processor receives sensor data from a sensor set which detects sensor data related to an environment of a communication device, creates a detected social signature from the received sensor data, determines which of the social signatures of the social templates has the greatest correspondence with the created social signature, retrieves from the memory the determined one social template having the greatest correspondence, and provides only as much information as allowed in the retrieved social template.

32 Claims, 3 Drawing Sheets

SYSTEM AND METHOD FOR MANAGING MOBILE COMMUNICATIONS

CROSS-REFERENCE TO RELATED APPLICATION

This application is a continuation of U.S. patent application Ser. No. 12/891,875, filed Sep. 28, 2010, currently pending, the disclosure of which is incorporated herein by reference.

BACKGROUND

1. Field

Aspects of the invention relate to automatically determining if an incoming communication is interruptive, and more particularly to the classification of a person's current actions such that selected callers can automatically or manually gauge the intrusiveness of a communication request.

2. Description of the Related Art

The development of pervasive communication technologies has delivered direct access to mobile device users worldwide. While access has given users the convenience of communication at all times this convenience in many cases is a burden as callers can inadvertently interrupt other activities which socially take precedence. One exemplary example is a phone ringing in the middle of a conversation—socially a person would never interrupt another conversation unless the matter was extremely urgent. The fact that communication requests cannot be socially integrated has made the pervasiveness of communication a burden and has lead to ignoring of calls (urgent or not) as well as allowing remote communications to take precedence over local communications.

SUMMARY

According to an aspect of the invention, a device to automatically provide differing levels of information according to a predetermined social hierarchy includes a memory which stores social templates, each social template corresponding to a unique social signature and being selectable to provide, for each level of the predetermined social hierarchy, a corresponding differing amount of information to each member of the predetermined social hierarchy; and a processor which receives sensor data received from a sensor set which detects sensor data related to an environment of a communication device, creates a detected social signature from the received sensor data, determines which of the social signatures of the social templates has the greatest correspondence with the created social signature, retrieves from the memory the determined one social template having the greatest correspondence, and provides to at least one member of the predetermined social hierarchy only as much information as allowed under the social hierarchy as defined in the retrieved social template.

According to an aspect of the invention, the sensor data comprises a location of the communication device; a movement of the communication device; and user social statistics indicating an interaction between the communication device and the environment of the communication device, and the processor compares the location with map data to determine a map location of the communication device, and creates the detected social signature to include information on the map location of the communication device, the movement being experienced by the communication device, and the environment of the communication device.

According to an aspect of the invention, the levels of the social hierarchy of the retrieved social template include a first social hierarchy level which provides one level of information as selected in the retrieved social template, a second social hierarchy level which provides another of level information as selected in the retrieved social template, and a third social hierarchy level which provides further information as selected in the retrieved social template; and the processor determines a level value of each member by comparing the member with members assigned to having the first social hierarchy level, the second social hierarchy level, and the third social hierarchy level, and provides only as much information as allowed by the determined social hierarchy level.

According to an aspect of the invention, the user social statistics includes an amount of light of the environment of the communication device, a sound level of the environment of the communication device, a detected heart rate of a user of the communication device, ultrasound levels of the communication device, infrared levels of the communication device, temperature levels of the communication device, local network/data logging of the communication device, capacitive readings of a touch screen of the communication device, a biometric based upon a user's use of the communication device, data related to the communications by and programs running on the communication device, pressure data of the communication device, magnetic field data of the communication device, proximity data of the communication devices, or combinations thereof.

According to an aspect of the invention, the processor further detects an error between the detected social signature and the social signature of the determined one social template having the greatest correspondence, updates the social signature of the determined one social template to include the detected error such that the social signature of the determined one social template incorporates the detected social signature where it is determined that the determined one social template is accurate, and creates a new social template using the detected social signature where it is determined that the determined one social template is not accurate.

According to an aspect of the invention, the processor automatically determines if an incoming communication from a communication requestor is interruptive by, prior to completing the communication, assigning the communication requestor to one of the levels of the social hierarchy, and providing to the communication requestor only as much information as allowed under the social hierarchy as defined in the retrieved social template.

According to an aspect of the invention, for at least one of the social templates, each level of the social hierarchy corresponds to a corresponding different social networking service, and the processor automatically provides different updates to each of the social networking services as allowed under the social hierarchy as defined in the one social template.

According to an aspect of the invention, one of the social networking services is for professional networking, one of the social networking services is for non-professional networking, and one of the social networking services is a microblogging service.

According to an aspect of the invention, for at least one of the social templates, there is a single level of social hierarchy for a social networking service, and the processor automatically provides an update to the social networking services.

According to an aspect of the invention, for at least one of the social templates, there is a single level of social hierarchy for a microblogging service, and the processor automatically provides an update to the microblogging service.

According to an aspect of the invention, at least one of the social templates corresponds to an emergency update, and when the processor detects an emergency situation from the sensor data, the processor automatically provides information related to the emergency to predetermined emergency services, friends and/or family members according to the detected emergency situation.

According to an aspect of the invention, the processor processes the received sensor data to obtain biometric data of a user of the communication device, creates the detected social signature from the received sensor data and the obtained biometric data, identifies the user according to the obtained biometric data, and retrieves from the memory the determined one social template having the greatest correspondence to the detected social signature for the identified user.

According to an aspect of the invention, one of the sensors comprises an input device which the user uses to input data, and the processor identifies the user according to a writing pattern of the user while inputting the data.

According to an aspect of the invention, one of the sensors comprises an optical sensor, and the processor identifies the user according to a pattern recognition unique to the user.

According to an aspect of the invention, one of the sensors comprises an audio sensor, and the processor identifies the user according to a speech pattern recognition unique to the user.

According to an aspect of the invention, one of the sensors comprises an Ultra Wideband sensor which provides ranging data regarding the environment, and the processor includes in the social signature a size of the location in which the communication device is found.

According to an aspect of the invention, a communication device to automatically provide differing levels of information according to a predetermined social hierarchy includes a sensor set which detects sensor data related to an environment of the communication device; a memory which stores social templates, each social template corresponding to a unique social signature and being selectable to provide, for each level of the predetermined social hierarchy, a corresponding differing amount of information to each member of the predetermined social hierarchy; a processor which receives the sensor data received from the sensor set, creates a detected social signature from the received sensor data, determines which of the social signatures of the social templates has the greatest correspondence with the created social signature, retrieves from the memory the determined one social template having the greatest correspondence, and provides to at least one member of the predetermined social hierarchy only as much information as allowed under the social hierarchy as defined in the retrieved social template; a transceiver which provides communication with respect to external devices, and sends the information as defined in the retrieved social template under the control of the processor; and a housing which houses the sensor set, the processor, the memory, and the transceiver.

According to an aspect of the invention, the sensor set comprises: a location sensor which senses a location of the communication device; an acceleration sensor which senses movement of the communication device; and a user social statistics sensor which senses an interaction between the communication device and the environment of the communication device, and the processor compares the location with map data to determine a map location of the communication device, and creates the detected social signature to include information on the map location of the communication device, the acceleration being experienced by the communication device, and the environment of the communication device.

According to an aspect of the invention, the device comprises a mobile device.

According to an aspect of the invention, the levels of the social hierarchy of the retrieved social template include a first social hierarchy level which provides one level of information, a second social hierarchy level which provides another level of information, and a third social hierarchy level which provides a different level of information; and the processor determines a level value of each member by comparing the member with members assigned to having the first social hierarchy level, the second social hierarchy level, and the third social hierarchy level, and provides only as much information as allowed by the determined social hierarchy level.

According to an aspect of the invention, the first social hierarchy level provides information including a desired contact state, the map location and the environment, the second social hierarchy level provides information including the desired contact state and the environment but not the map location, and the third social hierarchy level provides information on only the desired contact state.

According to an aspect of the invention, the sensor set further comprises an optical sensor which detects an amount of light of the environment of the communication device, and an acoustic sensor which detects a sound level and/or characteristics of the environment of the communication device.

According to an aspect of the invention, the processor further detects an error between the detected social signature and the social signature of the determined one social template having the greatest correspondence, updates the social signature of the determined one social template to include the detected error such that the social signature of the determined one social template incorporates the detected social signature where it is determined that the determined one social template is accurate, and creates a new social template using the detected social signature where it is determined that the determined one social template is not accurate.

According to an aspect of the invention, the processor automatically determines if an incoming communication from a communication requestor being received through the transceiver is interruptive by, prior to completing the communication, assigning the communication requestor to one of the levels of the social hierarchy, and providing to the communication requestor only as much information as allowed under the social hierarchy as defined in the retrieved social template.

According to an aspect of the invention, for at least one of the social templates, each level of the social hierarchy corresponds to a corresponding different social networking service, and the processor automatically provides different updates to each of the social networking services as allowed under the social hierarchy as defined in the one social template.

According to an aspect of the invention, one of the social networking services is for professional networking, one of the social networking services is for non-professional networking, and one of the social networking services is a microblogging service.

According to an aspect of the invention, for at least one of the social templates, there is a single level of social hierarchy for a social networking service, and the processor automatically provides an update to the social networking services.

According to an aspect of the invention, for at least one of the social templates, there is a single level of social hierarchy for a microblogging service, and the processor automatically provides an update to the microblogging service.

According to an aspect of the invention, at least one of the social templates corresponds to an emergency update, and when the processor detects an emergency situation from the sensor data, the processor automatically provides information related to the emergency to predetermined emergency services, friends and/or family members according to the detected emergency situation.

According to an aspect of the invention, the processor processes the received sensor data to obtain biometric data of a user of the communication device, creates the detected social signature from the received sensor data and the obtained biometric data, identifies the user according to the obtained biometric data, and retrieves from the memory the determined one social template having the greatest correspondence to the detected social signature for the identified user.

According to an aspect of the invention, the sensor set comprises an input device which the user uses to input data, and the processor identifies the user according to a writing pattern of the user while inputting the data.

According to an aspect of the invention, one of the sensors comprises an optical sensor, and the processor identifies the user according to a pattern recognition unique to the user.

According to an aspect of the invention, one of the sensors comprises an audio sensor, and the processor identifies the user according to a speech pattern recognition unique to the user.

According to an aspect of the invention, one of the sensors comprises an input device which the user uses to input data, and the processor detects a status of the communication device according to use or non-use of the input device.

According to an aspect of the invention, the input device comprises a touch screen display including a capacitive sensor, and the processor detects a status of the communication device according to changes in a capacitance detected by the capacitive sensor.

According to an aspect of the invention, one of the sensors comprises an Ultra Wideband sensor which provides ranging data regarding the environment, and the processor includes in the social signature a size of the location in which the communication device is found.

According to an aspect of the invention, a server in communication with a communication device via a network and which automatically provides differing levels of information according to a predetermined social hierarchy includes a memory which stores social templates, each social template corresponding to a unique social signature and being selectable to provide, for each level of the predetermined social hierarchy, a corresponding differing amount of information to each member of the predetermined social hierarchy; a processor which receives from the communication device sensor data received from a sensor set of the communication device which detects sensor data related to an environment of the communication device, creates a detected social signature from the received sensor data, determines which of the social signatures of the social templates has the greatest correspondence with the created social signature, retrieves from the memory the determined one social template having the greatest correspondence, and provides to at least one member of the predetermined social hierarchy only as much information as allowed under the social hierarchy as defined in the retrieved social template; and a transceiver which receives the sensor data from the sensor set in the communication device, and provides under the control of the processor to at least one of the members of the predetermined social hierarchy only as much information as allowed under the social hierarchy as defined in the retrieved social template.

According to an aspect of the invention, the sensor data comprises a location of the communication device, movement of the communication device, and an interaction between the communication device and the environment of the communication device, and the processor compares the location with map data to determine a map location of the communication device, and creates the detected social signature to include information on the map location of the communication device, the movement being experienced by the communication device, and the environment of the communication device.

According to an aspect of the invention, the levels of the social hierarchy of the retrieved social template include: a first social hierarchy level which provides information including a desired contact state, the map location and the environment, a second social hierarchy level which provides information including the desired contact state and the environment but not the map location, and a third social hierarchy level which provides information on only the desired contact state; and the processor determines a level value of each member by comparing the member with members assigned to having the first social hierarchy level, the second social hierarchy level, and the third social hierarchy level, and provides only as much information as allowed by the determined social hierarchy level.

According to an aspect of the invention, the sensor data comprises optical information from an optical sensor which detects an amount of light of the environment of the communication device, and acoustic information from an acoustic sensor which detects a sound level of the environment of the communication device.

According to an aspect of the invention, the processor further detects an error between the detected social signature and the social signature of the determined one social template having the greatest correspondence, updates the social signature of the determined one social template to include the detected error such that the social signature of the determined one social template incorporates the detected social signature where it is determined that the determined one social template is accurate, and creates a new social template using the detected social signature where it is determined that the determined one social template is not accurate.

According to an aspect of the invention, the processor automatically determines if an incoming communication from a communication requestor being received through the transceiver is interruptive by, prior to completing the communication, assigning the communication requestor to one of the levels of the social hierarchy, and providing to the communication requestor only as much information as allowed under the social hierarchy as defined in the retrieved social template.

According to an aspect of the invention, for at least one of the social templates, each level of the social hierarchy corresponds to a corresponding different social networking service, and the processor automatically provides different updates to each of the social networking services as allowed under the social hierarchy as defined in the one social template.

According to an aspect of the invention, one of the social networking services is for professional networking, one of the social networking services is for non-professional networking, and one of the social networking services is a microblogging service.

According to an aspect of the invention, for at least one of the social templates, there is a single level of social hierarchy for a social networking service, and the processor automatically provides an update to the social networking services.

According to an aspect of the invention, for at least one of the social templates, there is a single level of social hierarchy for a microblogging service, and the processor automatically provides an update to the microblogging service.

According to an aspect of the invention, at least one of the social templates corresponds to an emergency update, and when the processor detects an emergency situation from the sensor data, the processor automatically provides information related to the emergency to predetermined emergency services, friends and/or family members according to the detected emergency situation.

According to an aspect of the invention, the processor processes the received sensor data to obtain biometric data of a user of the communication device, creates the detected social signature from the received sensor data and the obtained biometric data, identifies the user according to the obtained biometric data, and retrieves from the memory the determined one social template having the greatest correspondence to the detected social signature for the identified user.

According to an aspect of the invention, the sensor set comprises an input device which the user uses to input data, and the processor identifies the user according to a writing pattern of the user while inputting the data.

According to an aspect of the invention, one of the sensors comprises an optical sensor, and the processor identifies the user according to a pattern recognition unique to the user.

According to an aspect of the invention, one of the sensors comprises an audio sensor, and the processor identifies the user according to a speech pattern recognition unique to the user.

According to an aspect of the invention, one of the sensors comprises an input device which the user uses to input data, and the processor detects a status of the communication device according to use or non-use of the input device.

According to an aspect of the invention, the input device comprises a touch screen display including a capacitive sensor, and the processor detects a status of the communication device according to changes in a capacitance detected by the capacitive sensor.

According to an aspect of the invention, one of the sensors comprises an Ultra Wideband sensor which provides ranging data regarding the environment, and the processor includes in the social signature a size of the location in which the communication device is found.

According to an aspect of the invention, a method of automatically providing differing levels of information according to a predetermined social hierarchy includes: constructing a social signature using sensor data sensed by a sensor set in a communication device; determining which one of a plurality of social templates has a social signature with a greatest correspondence with the constructed social signature, each social template corresponding to a unique social signature and being selectable to provide, for each level of the predetermined social hierarchy, a corresponding differing amount of information to each member of the predetermined social hierarchy; retrieves from a memory the determined one social template having the greatest correspondence; and providing to at least one member of the predetermined social hierarchy only as much information as allowed under the social hierarchy as defined in the retrieved social template.

According to an aspect of the invention, the sensor data comprises a location of the communication device, a movement of the communication device, and user social statistics indicating an interaction between the communication device and the environment of the communication device, and the constructing the social signature comprises comparing the location with map data to determine a map location of the communication device, and creating the social signature to include information on the map location of the communication device, the movement being experienced by the communication device, and the environment of the communication device.

According to an aspect of the invention, the method further includes detecting an error between the constructed social signature and the social signature of the determined one social template having the greatest correspondence; updating the social signature of the determined one social template to include the detected error such that the social signature of the determined one social template incorporates the detected social signature where it is determined that the determined one social template is accurate; and creating a new social template using the detected social signature where it is determined that the determined one social template is not accurate.

According to an aspect of the invention, the method further includes detecting an incoming communication from a communication requestor; and prior to completing the communication, assigning the communication requestor to one of the levels of the social hierarchy, and providing to the communication requestor only as much information as allowed under the social hierarchy as defined in the retrieved social template.

According to an aspect of the invention, the providing comprises providing an update to a social networking service as allowed under the social hierarchy as defined in the retrieved social template.

According to an aspect of the invention, the providing comprises providing a different update to another social networking service as allowed under the social hierarchy as defined in the retrieved social template.

According to an aspect of the invention, the providing comprises providing an update to a microblogging service as allowed under the social hierarchy as defined in the retrieved social template.

According to an aspect of the invention, the method further includes detecting an emergency situation from the sensor data, wherein the providing comprises automatically providing information related to the emergency to predetermined emergency services, friends and/or family members according to the detected emergency situation using one of the social templates.

According to an aspect of the invention, the method further includes obtaining biometric data using the sensor data; and identifying a user of the communication device according to the obtained biometric data, wherein the determining comprises determining the one social template having the greatest correspondence for the identified user.

According to an aspect of the invention, a computer readable medium is encoded with processing instructions to implement the method executed by one or more processors.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Embodiments of the present invention are designed to monitor social activity using multiple sensors. In the embodiment shown in FIG. 1, a mobile device 100 monitors location, acceleration, orientation, audio and optical samples using a set of sensors which provides a set of social statistics. In the shown example, the sensor set includes sensors 110, 120, 130, 140 included in the mobile device 100. A user's activity is classified based on the set of social statistics obtained from the sensors 110, 120, 130, 140 identification of location, acceleration, orientation, audio and optical samples as well as static and/or dynamic classification rules. Examples of user activities include driving, napping, in a meeting, showering, etc. While shown as incorporated into the body of the mobile device 100, it is understood that one or more of the sensors 110, 120, 130, 140 can be connectable to the mobile device 100 using wired and/or wireless communication, such as where a camera or headset is connected using a Bluetooth connection.

Figure 1:
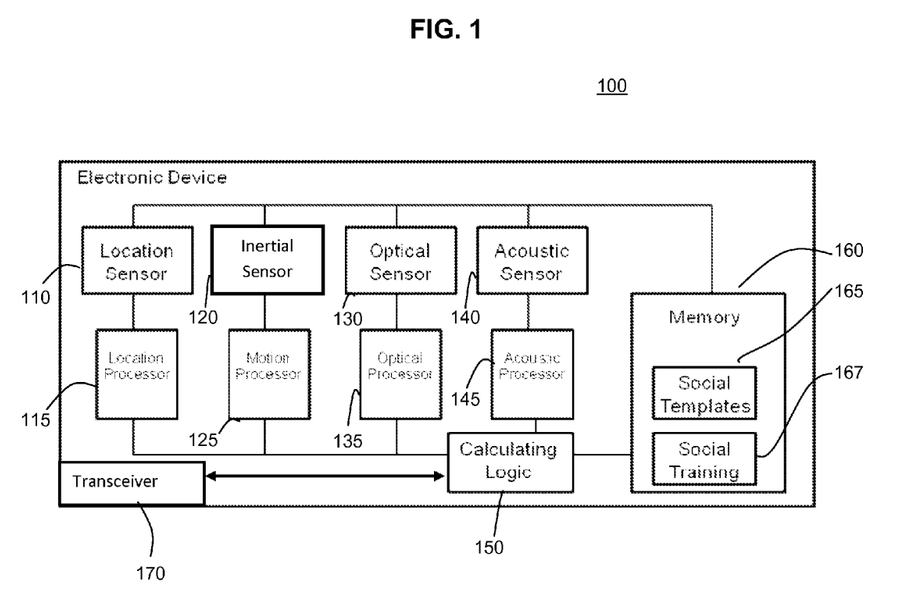
FIG. 1 is a block diagram illustrating an electronic device, in accordance with one embodiment of the present invention.

For instance, a first calculation is made of a user's location and the position of the mobile device 100 using a GPS statistic associated with the user's location detected from the location sensor 110, and local measurements of accelerometers included in the inertial sensor 120. Location information is obtained by the location based sensor 110. In the shown mobile device 100, additional user social statistics sensors are measured using the optical sensor 130 and the acoustic sensor 140, which collect additional information relevant to an interaction between the environment of the mobile device 100 and the mobile device 100.

While the user social statistics sensors are shown including the sensors 110, 120, 130, 140, it is understood that the user social statistics sensors can include other types of sensors in addition to or instead of one or more of these sensor 110, 120, 130, 140, such as sensors which detect heart rate, ultrasound sensors, infrared sensors, temperature sensors, pressure sensors, magnetic field sensors, proximity sensors, and other environmental sensors which detect a user environment, or combinations thereof.

While not shown, in other aspects of the invention, the social statistics sensors can include local network/data logging which records the network availability through the course of a day. Such logging could include detection of Near Field Communication (NFC), Bluetooth, WiFi or other short range communication networks. In this way, a social signature might become associated with specific mobile devices and networks in particular locations and times in order to help identify that, when these combinations of networks are detected, a particular social template is to be used. For instance, if one of the detected mobile devices corresponds to logging associated with a particular friend, one social template might be chosen in preference to another social template which might be more willing to allow communication if the user is sensed to be alone.

While not shown, in other aspects of the invention, the social statistics sensors can include sensing a touch screen. The touch screen is a capacitive interface, and therefore if there is no capacitive reading, it might indicate that the mobile device 100 is not exposed or being held (example, in a backpack or drawer). In contrast, if the capacitive reading is low, the level might indicate that the mobile device 100 is in a pocket or being held. Similarly, at other capacitive readings, this would be indicative that the user is actively using the mobile device 100. The level of the capacitive reading would therefore be usable in the social signature in aspects of the invention.

In other aspects of the invention, the social statistics can include a biometric based upon a user's use of the mobile device 100. The biometric could be used to identify the user, and thus verify which user is using the mobile device 100. Such biometrics could be obtained from specific sensors, or through combinations of sensors used for other purposes and whose output is further processed. By way of example, the biometric could be based upon an analysis of patterns obtained through the optical sensor 130 and the acoustic sensor 140 as analyzed by the processors 135, 145 and/or the calculating logic 150.

An example of a biometric is based upon patterns specific to a user's inputting of data. For instance, for a touch screen or a keyboard, people tend to have the same rate of time between certain actions and tend to make the same input errors again and again. Time is the key distinguishing element in this biometric. For instance, when inputting, three different letters (example JIM), the user will type certain words with a proportional time between each key stroke (i.e., J<21 ms>I<55 ms>M). While the time may vary, the fact that the time between J and I will be roughly half that of the time between I and M will be generally constant for that user. In contrast, a different user will have different timings between each letter pair. However, it is understood that other biometrics could be used, such as user name and passwords, retina and/or fingerprint recognition, facial and motion recognition techniques, voice, hand geometry, and other mechanism by which a particular user is identified based upon that user's characteristics. Such biometrics could be detected using combinations of the sensors 110, 120. 130, 140, or through use of additional sensors. The use of a biometric can be useful in confirming who you are communicating with as the mobile device 100 can be used by multiple users, and therefore would be usable in the social signature in aspects of the invention.

It is noted that usage of the mobile device 100 can also be used in the social statistic as a form of sensor data. In these instances, the usage could be detected by an element being used acting as a sensor (e.g., the calculating logic 150 performing an operation, a transceiver 170 performing a communication operation, and/or an input device receiving information), and the resulting usage data being included in the sensor data to create a social signature.

For instance, the usage data can be communications by and programs running on the mobile device 100 and would be sensed by the calculating logic 150, whereby the calculating logic 150 would be a type of sensor for purposes of forming a social signature. As another example, where the mobile device 100 is linked to a Bluetooth headset, this communication status could be detected by a transceiver 170 and/or the calculating logic 150 as a form of sensor data, and the sensor data could be used in the social statistic. Similarly, where the user is running an email program, a game program, or a media program, this usage data could be detected by the calculating logic 150 as a sensor and the usage data included in the sensor data could be used in the social statistic. Moreover, where a transaction is being processed (such as the purchase of an item) or the user is using an input device (such as a key board, touch screen display, joystick, clickwheel), this usage data may be detected by the calculating logic 150 and/or input device as a sensor and indicate that the user is available for certain types of calls. Thus, the operations of the mobile device 100 itself could furnish information as part of the social statistics.

A second calculation is made of the user social statistic based on the static and/or dynamic rule set. The final use of the user's social classification statistic is calculated based on the first calculation, the second calculation, and a preset reporting level which offers a specific hierarchical level of social classification based on the caller.

The mobile device 100 may be a cellular phone, wrist watch, mp3 player, portable media player, personal digital assistant (PDA), mobile game console, laptop computer, or any other device which can support an set of sensors and be carried by a user. In the shown embodiment, the mobile device 100 is a portable electronic device that includes one or more inertial sensors 120, one or more location based sensors 110, one or more audio sensors 140 and one or more optical sensors 130.

The inertial sensor 120 may measure accelerations along a single axis or multiple axes, and may measure linear as well as rotational (angular) accelerations. In one embodiment, one or more inertial sensors 120 together provide three dimensional acceleration measurement data so as to indicate the instantaneous motion of the mobile device 100, and hence given an indication as to the motion of the user of the mobile device 100. The inertial sensor 120 may generate acceleration measurement data continuously, or at a sampling rate that may be fixed or variable. In one embodiment, the inertial sensor 120 receives a timing signal from a timer (not shown) to take measurements at the sampling rate. The inertial sensor 120 provides the acceleration measurement data and/or movement data to a motion processor 125.

However, it is understood that the functionality of the inertial sensor 120 can be estimated, such as where the overall motion or movement is detected using differences in location sensed by the location sensor 110. Conversely, where the location is not known due to a lack of a signal to the location sensor 110 or where the location sensor 110 is not included, the inertial sensor 120 can be used to estimate the location of the mobile device 100 relative to a known starting point. The known starting point can be set by the user, or sensed from a communication from known access points and networks having a known location.

The acoustic sensor 140 may generate acoustic measurement data continuously, or at a sampling rate that may be fixed or variable. In one embodiment, multiple acoustic sensors are used to filter noise from relevant acoustic signals and preprocessing of the acoustic signal using signal processing techniques can be used to simplify classification calculations. Examples of the acoustic sensor 140 include a microphone or like mechanism which detects acoustics and sounds. The acoustic sensor 140 provides the detected acoustics and sound to an acoustic processor 145.

The optical sensor 130 may generate simple light level measurement data continuously, or at a sampling rate that may be fixed or variable. The optical sensor 130 provides the light level measurement to an optical processor 135. While not required in all aspects, the optical sensor 130 can be a camera (still or video) as used in mobile phones.

In one embodiment, the optical sensor 130 includes charged coupling device (CCD) sensors, whereby image data is sampled by the CCD sensors and is used to better classify the social situation and preprocessing of the optical signal using signal processing techniques can be used to simply classification calculations. For instance, if the CCD sensors detect a low level of light, the mobile device 100 can determine that the mobile device 100 is in a dark location (such as in a pocket, in a room with the lights off, or outside during the night). Whereas if the CCD sensors detect the high level of light, this could indicate that the mobile device 100 is in use or is merely exposed in a room with the lights on or is outside during the daytime. While described in terms of the visible light, the optical sensor 330 could also be a type of camera which detects non-visible light spectra, such as infrared or ultraviolet detectors, or other radiation and energy detectors.

The location based sensor 110 can include a single location based sensor, or multiple location based sensors. Where there are multiple location based sensors, the sensors can be of the same type to provide redundancy, or of multiple different types of location based sensors to provide location information in case one type of signal is not working. The location based sensor 110 provides the location information to a location processor 115.

In one embodiment, the location based sensor 110 includes a global positioning system (GPS) sensor comprising a GPS antenna and a GPS receiver. The GPS sensor obtains location information from one or more GPS satellites, which are received at the GPS antenna and processed using the GPS receiver.

In one embodiment, the location based sensor 110 includes a network localization sensor. A network localization sensor determines a position by receiving signals from multiple sources that have known locations, and calculating the position based on the combined signals using trigonometric relations. The signals used to determine location may be radio frequency (RF) signals formatted according to the Bluetooth protocol, Zigbee protocol, wireless fidelity (WiFi) protocol, global system for mobile communications (GSM) protocol, 3G mobile communications protocol, etc. For example, a first network localization sensor may perform network triangulation using signals received from a mobile phone service provider's cell towers. In another example, a second network localization sensor may perform triangulation using wireless fidelity (WiFi) signals received from multiple nearby WiFi access points (e.g., hotspots).

In one embodiment, the location based sensor 110 includes a radio frequency identification (RFID) reader that reads transponders (e.g., passive integrated transponders (PITs)). Each transponder may report a specific location. When, for example, a transponder that reports location A is read, the location based sensor knows to a high degree of certainty that the electronic device is at location A.

Alternatively, the location based sensor 110 may itself include a PIT that is read by an RFID reader at a known location. Upon the PIT being read by a particular RFID reader having a known location, the location based sensor may learn its current location.

As noted above, the location based sensor 110 can comprise a system of multiple location based sensors which may be used separately or together. When used separately, each location based sensor may independently determine a location of the electronic device, and report the location to the location processor 115. When used together, the capabilities of one location based sensor 110 can be used to augment the capabilities of another location based sensor. Examples of such cooperative use of location based sensors include assisted GPS and enhanced GPS, in which location data reported by a network localization sensor is used to augment a GPS sensor and to reduce the time and processing effort needed to quickly identify a location. A single location may then be reported to the location processor 115.

The location based sensor 110 may generate location information continuously, or at a sampling rate that may be fixed or variable. In one embodiment, the location based sensor 110 receives a timing signal from a timer (not shown) to take measurements at the sampling rate. The location based sensor 110 may obtain location measurements at a sampling rate that is the same as or different from the sampling rate at which the inertial sensor 120 collects acceleration measurement data. In this manner, the mobile device 100 can collect instantaneous accelerations from the acceleration measurement data measured by the inertial sensor 120, as well as long term accelerations using the differences in the location measurements measured by the location based sensor 110.

The location based sensor 110 (or location based sensors) can report a position of the electronic device 100 as a latitude and longitude, and may report a horizontal accuracy. In one embodiment, the horizontal accuracy of the location is reported as a confidence radius. For example, a location may be reported with a horizontal accuracy of 3 m, meaning that the reported location is accurate within a circle having a 3 m radius. Accuracy of the location may vary from about 1 m to about 100 m for location data obtained by a GPS sensor, depending on user location (e.g., in a city, under open sky, under a tree, in a building, etc.). The location information may further include an altitude, and may include a vertical accuracy. The location information may also include a time that the location was recorded.

In one embodiment, the inertial sensor 120 is coupled to the motion processor 125. The motion processor 125 processes acceleration measurement data received from the inertial sensor 120 to provide data used to provide a social signature of the user and/or as a biometric. For instance, specific patterns of acceleration might indicate specific activities (sleeping versus running versus walking), and the rhythm of such movement could also indicate the user to the extent the user's accelerations provide a unique pattern.

In a one embodiment, the location sensor 110 is coupled to a mapping processor included in the location processor 115. The mapping processor processes location measurement data received from the location sensor 110 to provide data used to identify a social classification of a person to whom communication is desired. For instance, in an aspect of the invention, the mapping processor can compare the sensed location with known locations in the user's address book or contact list to determine the location (i.e., at home, at a dentist office, at work). Additionally, in other aspects, the mapping processor can compare the sensed location with a map stored in the mobile device 100 or retrieved from a query to an internet service such as MapQuest or Google maps, and determine the location as being a restaurant, store, office or other like location according to such publicly available information.

In other aspects of the invention, the social statistics sensors can include an Ultra Wideband sensor which can provide ranging data, such as occurs with radar. In this manner, the ranging data could provide a 3D image of the room in which the mobile device 100 is located, and/or provide simple room size and obstacle location measurements. The use of the ranging data would be usable in the social signature in aspects of the invention. By way of example, the ranging data could be usable in the social signature when combined with the map location detected from the mapping processor the location on a map, thereby allowing a social template to be constructed to provide information based both upon map location and a location relative to walls of a specific room in that location.

In one embodiment, the acoustic sensor 140 is coupled to an acoustic signal processor included in the acoustic processor 145. The acoustic signal processor processes acoustic samples of data received from the acoustic sensor 140 to provide data used to identify a social classification of a person to whom communication is desired.

In one embodiment, the optical sensor 130 is coupled to an optical signal processor included in the optical processor 135. The optical signal processor processes optical samples of data received from the optical sensor 130 to provide data used to identify a social classification of a person to whom communication is desired.

In one embodiment, a combination of any inertial sensor 120 coupled to the motion processor, the location sensor 110 coupled to the mapping processor, the acoustic sensor 140 coupled to the acoustic signal processor and/or the optical sensor 130 coupled to the optical signal processor is used to provide data used to identify a social classification of a person to whom communication is desired.

In one embodiment, a combination of any inertial sensor data, location sensor data, acoustic sensor data and/or an optical sensor data is formatted for processing at a location other than the mobile device 110 and subsequently used to identify a social classification of a person to whom communication is desired. In this manner, the mobile device 110 needs to devote less processing time and energy to perform such social classification and relies upon an outside computational device to provide such functionality.

In the shown embodiment, the social classification is performed in the mobile device 100. Specifically, a calculating logic 150 receives the processed data from the location processor 115, the motion processor 125, the optical processor 135, and the acoustic processor 145, and compares the processed data with social templates 165 stored in a memory 160 included in the mobile device 100. The memory 160 can be removable or permanently installed in the mobile device 100. The calculating logic 150 provides the result of the comparison to a requesting caller using a transceiver 170 via a network according to a hierarchical social classification. While shown as included in the device 100, it is understood that the transceiver 170 can be removable from the device 100.

Examples of hierarchical social classification that can be identified include high level available, busy, do not disturb. Under each of these broad classifications can be more actuate classifications which are potentially available to a more select social group. Under the hierarchical tree, do not disturb can be classifications such as at the dentist, sleeping or with a customer. While a user may chose to still advance the call they will do so being able to socially weigh the urgency of the communication with the social classification of the person being contacted. Each set of hierarchical social classifications is stored in a separate social template.

The calculating logic 150 can further use the data from the processors 115, 125, 135, 145 to classify a current user's activity from a plurality of predefined identifiable user activities as well as trained user activities. In one embodiment, the calculating logic 150 identifies a user's social activity by monitoring for different social signatures, and applies a corresponding social template to determine how to treat an incoming communication request.

In one embodiment, when enough events indicative of a particular user social activity are detected, the calculating logic 150 identifies the activity as being performed by the user. In one embodiment, events may include positive events (ones that must be met to classify a social state in a certain way) and negative events (ones that indicate that a social state cannot be classified certain way). For instance, where a user is classified as entering a coffee shop at 7:32 am which is his normal routine, the classification can be made that he is on his way to work and has a 97% probability of arriving on time at 8:02 am according to the corresponding social template. However, in this instance, he orders two coffees and arrives at work at 8:20. This deviation is a negative event from the classification of the coffee ordering time to the arrival at work, and a positive event from the classification of the number of coffees ordered as well as time to the user's arrival time at work.

Once the system has identified a user activity, the system may apply a set of motion criteria specific to the identified social state to estimate one or more user social statistics (e.g., to detect intrusiveness of a communication request). Social state criteria may include thresholds, comparison requirements, action windows, etc. For instance, in relation to the coffee shop example above, the comparison may be looking at the purchase amount, audio input and physical location in comparison to typical actions to say socially that the user is having a tall, soy latte with a friend at the coffee shop. This may however not be what is reported to everyone depending on the social template. Thus, the social template may allow specific friends to know that he is drinking coffee at the coffee shop, may allow his co-workers to know that he is in a personal meeting, and only allow the rest of the world to know that he is busy and should not be disturbed. These would be examples of social network grouping where a single event would be reported in multiple ways based on where the requestor fit in this user's social network. So certain social states may cross a threshold of what should be reported to which groups, a comparison of data previously shared versus currently available to be shared may be used, and specific action windows can be used to allow the user to share data after the event so that nothing is provided without knowledge and this becomes the basis of further training.

Each social signature is indicative of a different type of activity. Events occur when certain motion, location, acoustic and optical criteria are satisfied. For instance, when a location signature has moved to a known room in a house such as a home nursery, the motion signature is static, the optical information indicates a dim room and the acoustic information indicates rhythmic breathing, the social signature is that of the mobile phone user and baby napping. From the identified social signature, the calculating logic 150 selects the social template to select how much information is provided to a category of communicant hoping to access the mobile phone user. The social template would then be programmed to reduce the information to be transmitted based upon user-defined relationships and levels of access.

For instance, where the social signature is that of the mobile phone user and baby napping, the social template is for do-not-disturb-due-to-Mother-and-baby-sleeping as set forth in Tables 1 and 2.

TABLE 1 do-not-disturb-due-to-Mother-and-baby-sleeping social signature

| Sensor | Value range |
|---|---|
| Location | 39.78° N, 104.88° W ± 5 m |
| Inertial | 0 m/s$^2$ ± .2 m/s$^2$ |
| Optical | 223 Im ± 15 Im |
| Acoustic | −63 db ± 5 db |

TABLE 2 do-not-disturb-due-to-Mother-and-baby-sleeping social hierarchy

| Social Hierarchy | Information |
|---|---|
| First Social Hierarchy Level - Father | Provide information on location, duration of state, and estimate of baby sleep time |
| Second Social Hierarchy Level - Friend | Provide information on baby sleeping |
| Third Social Hierarchy Level - School, Work | Do not disturb except in emergency |
| Fourth Social Hierarchy Level - Strangers | Do not disturb |

In this example, assuming that the location sensor 110 senses the location is at 39.78° N, 104.88° W, the inertial sensor 120 senses no acceleration, the optical sensor 130 senses a light value of 223 Im, and the acoustic sensor 140 senses a sound level of −63 db, the calculating logic 150 compares the detected social signature with the social signature of the social templates 165 included in the memory 160, and selects the social template for do-not-disturb-due-to-Mother-and-baby-sleeping as being the closest match to the detected social signature. The selected social signature is then applied against requests for communication either using the calculating logic 150 within the mobile device, or on a server through which such communication must be routed.

Assuming the communication is from the Father, the social template is programmed to give the Father the First Social Hierarchy Level, and allow the Father to know that the mobile device 100 of the Mother is with the baby, the location, for how long, and who is napping (both Mother and Baby or Baby only). In this way, the social template provides a high level of information to the Father so that the Father can make an informed choice about whether to place the call, or to instead send an email or text.

Assuming the communication is from the neighbor, the social signature is programmed to give the neighbor a Second Social Hierarchy Level and less information is to be provided. In this case, the social template only indicates that the Baby is sleeping, so that the neighbor or friend can make an informed choice about whether to place the call, or to instead send an email or text, but without being given as much detail as to the location and duration of the social signature.

Assuming the communication is from the office, the social signature is programmed to give the office the Third Social Hierarchy Level and even less information is to be provided but with specific information about when the call would be welcomed. In this case, the social template only indicates that the mobile phone user does not want to be disturbed, except in an emergency. Thus, when an emergency call is to be made from the school or office, the caller will know that the mobile phone user is available and welcomes such calls. Alternately, where there is no emergency, the caller can make an informed choice about whether to place the call, or to instead send an email or text, but without being given any detail beyond being told to only call in limited circumstance. Thus, an employee would know that the employer would not welcome a routine call, but would be available should an emergency arise.

Assuming the communication is from the stranger, the social signature is programmed to give the stranger the Fourth Social Hierarchy Level and indicate only that the caller is not to be disturbed. While not required in all aspects, the social template could direct any such calls straight into a voice mail to block reception entirely.

However, it is understood that the social hierarchy level could be changed for each social template. For instance, assuming that the Mother is accorded the First Social Hierarchy Level in most social templates, there may be times when the Father does not want the location information to be provided. For instance, assuming the Father is purchasing a gift, the social template could be created to not provide the location information to the Mother (either specifically or to all First Social Hierarchy Level members) in certain locations, and thus create exceptions to the level of information provided in the same or other social templates. Thus, while categories of social hierarchy levels can be established, exceptions can be programmed according to the needs of the end user.

As such, each social template can be set up with varying levels of granularity in so far as who is given which information about the user of the mobile device 100 prior to the call being placed. However, in order to ensure that the social template is accurate, the mobile device 100 includes a social training program 167 stored within the memory 160. Using the social training program 167, the user can save particular sets of social signature as new social templates, or increase the accuracy of an existing social template using the social signature. While described in terms of four social hierarchy levels, it is understood that additional or fewer levels can be provided, depending on the social template or through user training as will be described below.

Using the above example in relation to the Mother and the Baby, in order to set up the social template in the first instance, the Mother would activate the social training program 167 while in the nursery with the Baby, and the social signature would be associated with that particular social template. Specifically, the data sensed by the location sensor 110, the inertial sensor 120, the optical sensor 130, and the acoustic sensor 140 would be correlated with the new social template, and the Mother would then enter the degrees of information to be provided to various categories of potential callers (i.e., Father, Friend, Neighbor, Office, School, Stranger etc.). Subsequently, should a caller be given the wrong amounts of information, the Mother could again activate the social training program 167 to improve the social signatures recognized by the social template. In this manner, each social template could be associated with more than one set of social signatures so as to allow for variations from the original detected social signature and to improve the functionality of the mobile device 100.

Once the mobile device 100 assigns the social template associated with the current social signature, the assigned social template is sent to an external server within the mobile network of the caller. As such, when the caller attempts to contact the mobile device 100, the caller is given the information according to the hierarchical social classifications prior to contacting the mobile device 100.

Additionally, the mobile device 100 consistently monitors for a change in the social signature, such as where the mobile device 100 changes location or detects a change in the optical or acoustic levels. At this point, the mobile device 100 will determine whether the social signature indicates a change in the currently assigned social template, or whether another social template is to be assigned. Using the above example, where the social signature indicates that the baby is now awake and crying, the social template would be changed to allow information on the new status of the baby, but likely maintain a do-not-disturb social template.

Figure 2:
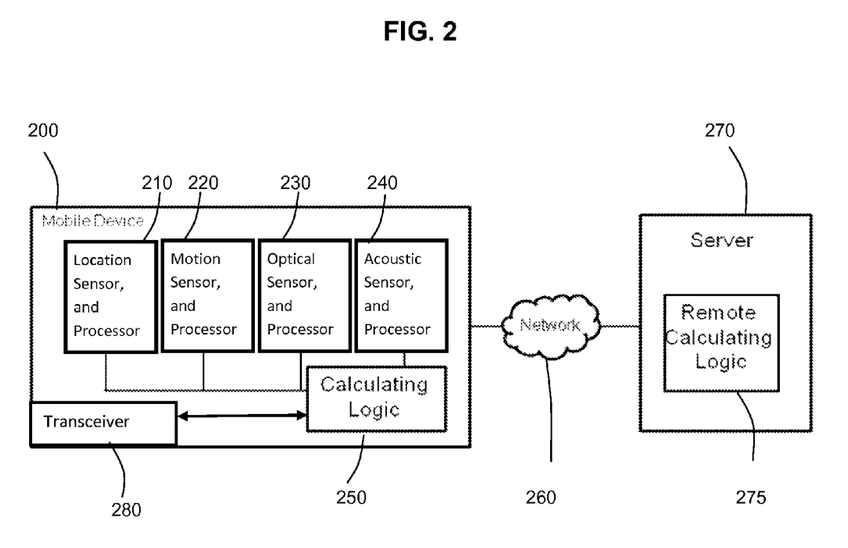
FIG. 2 illustrates a block diagram of a social monitoring system, in accordance with one embodiment of the present invention.

While described in the context of the mobile device 100 having the social templates and social training performed internally, in another embodiment of the invention shown in FIG. 2, the social templates and social training is performed externally. As shown, a mobile device 200 monitors location, acceleration, orientation, audio and optical samples using a location sensor and processor 210, a motion sensor and processor 220, an optical sensor and processor 230, and an acoustic sensor and processor 240 included in the mobile device 200. The location sensor and processor 210 performs generally the same function as the location sensor 110 and location processor 115 of FIG. 1, the motion sensor and processor 220 performs generally the same function as the inertial sensor 120 and motion processor 125 of FIG. 1, the optical sensor and processor 230 performs generally the same function as the optical sensor 130 and optical processor 135 of FIG. 1, and the acoustic sensor and processor 240 performs generally the same function as the acoustic sensor 140 and acoustic processor 145 of FIG. 1. A calculating logic 250 receives the processed data from the location sensor and processor 210, the motion sensor and processor 220, the optical sensor and processor 230, and the acoustic sensor and processor 240, and transmits the processed data to a server 270 using a transceiver 280 via a network 260.

While not required in all aspects, the network 260 can be a wireless communication network such as a CDMA, GSM, or like mobile communication protocols.

The processed data received at the server 270 is compared with social templates stored in a memory included in a remote calculating logic 275 of the server 270. The remote calculating logic 275 provides the result of the comparison to a requesting caller via the network 260 according to a hierarchical social classification. In this manner, the assignment and training of the social templates according to social signatures is performed externally at the server 270 instead of within the mobile device 200. The assigned social template is maintained in a server (such as the server 270) through which the caller must access to reach the mobile device 200. As such, when the caller attempts to contact the mobile device 200, the caller is given the information according to the hierarchical social classifications prior to contacting the mobile device 200.

However, it is understood that, while shown as lacking the capability of providing the hierarchical social classification within the mobile device 200, the mobile device 200 could also have this capability locally within the mobile device 200 so as to have an internal and external capability of selectively providing information according to the hierarchical social classification incorporated in the social templates.

Figure 3:
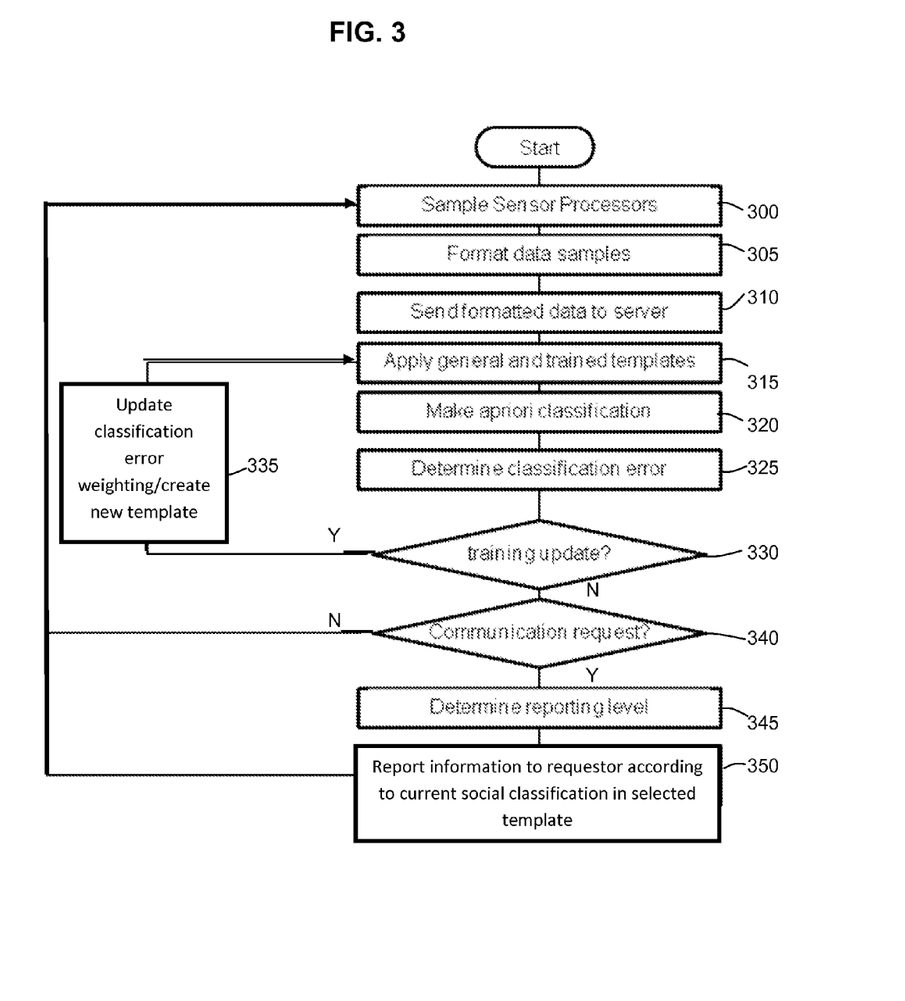
FIG. 3 illustrates a flow diagram for a method of social monitoring activity sensors in accordance an embodiment of the present invention.

FIG. 3 illustrates a flow diagram for a method of social monitoring using sensors in accordance an embodiment of the present invention. In operation 300, the sensor data is sampled by the calculating logic 150, 250. In the embodiments of FIGS. 1 and 2, calculating logic 150, 250 detects the data from the location processor 115, 210, the motion processor 125, 220, the optical processor 135, 230, and the acoustic processor 145, 240. The sampling can be performed at preset intervals, or continuously.

In operation 305, the data samples detected by the calculating logic 150, 250 are formatted into social signatures for use in matching against social templates. In operation 310, where the mobile device is not performing a comparison of the social signatures with social templates, such as in the embodiment shown in FIG. 2, the calculating logic 250 sends the formatted data to the server 270 across the network 260. However, it is understood that operation 310 need not be performed in all aspects of the invention, such as where the mobile device 100 of FIG. 1 is being used.

In operation 315, the formatted data is compared to the social templates. In operation 320, the calculating logic 150 or the remote calculating logic 275 makes an a priori classification assigning one of the social templates to the formatted data. This a priori classification is based upon a closest match between the social signature in the formatted data and the social signature or signatures associated with each social template.

The calculating logic 150 or the remote calculating logic 275 detects a classification error in operation 325. Since the social signature in the formatted data and the social signature or signatures associated with each social template may not exactly match, this difference is a classification error. Conversely, where there is an exact match, there is no classification error.

By way of example, assuming the mobile device user is at a movie, the location sensor 110 detects the location as that of the movie theatre, and the inertial sensor 120 indicates no movement. Further, the mobile device 100 might include a near field communication (NFC) device which detects that the mobile device 100 was used to purchase a ticket to a movie, and the movie start time. The mobile device 100 might also include a clock which detects that the start time has passed, but the optical sensor 130 determines that the movie theater lights are bright. In contrast, for the social signature of a social template for watching a movie, the optical sensor could be for a low light, but also include the movie theater location, no acceleration, time being after the start time, and the ticket data from the NFC device. In this instance, the social signature in the formatted data would include a number of matching elements (i.e., location, acceleration, time, and NFC data) which are consistent with the social signature of a social template for watching a movie, but the error would exist in relation to the optical data. Thus, in operation 320, the a priori classification would be the social template for watching the movie, and the classification error in operation 325 would be in relation to the optical data being high as opposed to low.

Where there is a classification error, a training update can be optionally performed in operation 330. If the training update is to be performed, the classification error weighting is updated or the social signature is matched to a new social template created by the user in operation 335. According to an aspect of the invention, where there is the classification error such that the training update is needed, the user might be prompted to confirm that the a priori classification is accurate. If the a priori classification is accurate, the classification error weights are updated in operation 335 for that particular social template to ensure that the social signature in the formatted data is recognized in the future as belonging to the same social template. In contrast, where the a priori classification is not accurate, a new social template can be created. In this manner, the social templates are constantly refined. The updated classification error weighting and/or template from operation 335 is stored in the memory 160 or in the server 270.

Using the above example in relation to the social template for watching a movie, the same social template for watching a movie could have an updated error weighting in relation to the relative importance of the lighting, and thus would be associated with more social signatures. In contrast, the user might create a new social template, such as a social template for waiting to watch a movie in which the user would allow more communication.

While not required in all aspects, such updated error weights and new social templates could be generated solely in relation to the user of the mobile device 100, 200, or could also be shared from other mobile devices. In this manner, the social templates could be unique to the user, or be refined through the collective experience of any number of other user experiences.

While not required in all aspects, the training and updating in operations 330, 335 could be performed using Fuzzy Adaptive Resonance, Learning Vector Quantization, or other techniques whereby a computational device learns from detected errors in order to improve future reactions to like sensor inputs.

Where there is no training to be performed (such as where there is no classification error or where the classification error is de minimus), the calculating logic 150 or the remote calculating logic 275 detects whether there has been a communication request to the mobile device 100, 200 in operation 340. Where there is no communication request, the process returns to operation 300 to determine if the social signature has changed.

Where there is a communication request, the calculating logic 150 or the remote calculating logic 275 compares the requestor with the access level assigned to the requestor contained in the selected social template in operation 345. In operation 350, the information level assigned to the requestor is provided to the requestor prior to communication being completed in order for the requestor to determine, based upon the information provided, whether the communication should be completed or whether the mobile device user would not appreciate the call. After reporting the information, the process returns to operation 300 to determine if the social signature has changed.

While described in the context of voice communications, it is understood that the social templates could also be used to prevent other forms of communication, such as text messages, facebook updates, emails, instant messages, or other like communications which can be distracting to a user of a mobile device. By way of example, the detected social signature might correspond to a user driving a car with a Bluetooth headset. In this case the social template might provide information to the sender that the user is driving and is not available to read the text message, but should instead be contacted using a voice communication.

Moreover, it is understood that aspects of the invention do not require a communication request to provide the differing levels of information such that operation 340 is optional. By way of example, in aspects of the invention, the social template might be to log in and send or update specific information to one or more social networking services and/or microblogs. The social template could specify the type of information to be provided, as well as any necessary log in and username information needed to authorize the social networking services and/or microblogs to receive such updates. While not required in all aspects, a detected biometric would be useful in ensuring that the proper account is accessed.

In this manner, the device 100, 200 could chronicle a user's status, and could provide different updates to different social networking services. For instance, a user in a coffee shop might want to update their social networking site (such as FACEBOOK) to indicate to users that they are at the coffee shop. Where the user has more than one social networking site, the user might not want this information on a profession networking site (such as LINKED-IN). Conversely, where the user is in a work related activity, such as at a conference, the social template could be configured to provide the same or different updates on the social and professional networking sites. A similar chronicle of the user's status could be provided on TWITTER or other microblog site. In this way, the device 100, 200 would be able to provide constant feeds and updates to automatically enliven a user's social and professional networking site(s) and/or issue microblogs such as tweets according to a status sensed from the various device sensors 110, 120, 130, 140.

In aspects of the invention, even where a user does not have a social networking service and/or microblog set up, the social template could be configured to provide specific information using text, email and/or voice messaging. By way of example, the social template could be designated for emergency situations, and automatically provide information to the police, fire department, family and/or friends. Such communication could be through text messages, emails, computer read messages sent to a voice line, and, where social networking service and/or microblog are set up, through networking service and microblog updates. In this way, the device 100, 200 would be able to summon help in an emergency situation according to a status sensed from the various device sensors 110, 120, 130, 140.

By way of example, the device sensors 110, 120, 130, 140 could detect a sharp audio sound and a sudden deceleration, and the calculating logic 150, 275 could detect the social signature as being for a car crash. From the social signature for the car crash, the calculating logic 150, 275 would select a social template which provides information on the time since impact and location of impact to the police and ambulance services, as well as providing an alert to family and/or friends.

By way of another example, the device sensors 110, 120, 130, 140 could detect heat and an optical/acoustic signature consistent with a fire, and the calculating logic 150, 275 could detect the social signature as being for a fire. From the social signature for the fire, the calculating logic 150, 275 would select a social template which provides information on the likelihood of a fire, and location of fire to the police and fire department, as well as providing an alert to family and/or friends.

By way of a further example, the device sensors 110, 120, 130, 140 could detect a sudden change in breathing signatures as well as a change in a user's pulse indicative of a heart attack, and the calculating logic 150, 275 could detect the social signature as being for a medical emergency. From the social signature for the medical emergency, the calculating logic 150, 275 would select a social template which provides information on the type of medical emergency, and a location of the medical emergency to emergency services and/or the fire department, as well as providing an alert to family and/or friends.

While described in terms of a mobile device, it is understood that aspects of the invention need not be limited to a device that can be carried by a user. For instance, the device could be mounted to a moving vehicle and thus not be carried by a user. Further, aspects need not be used in a device which is mobile, such as where the device is in a room and observes sensor inputs which change as in a security system or other system which utilizes sensors.

It will be appreciated by those of ordinary skill in the art that any configuration of the system may be used for various purposes according to the particular implementation. The control logic or software implementing the present invention can be stored in main memory, mass storage device, or other storage medium locally or remotely accessible to processor.

It will be apparent to those of ordinary skill in the art that the system, method, and process described herein can be implemented as software stored in main memory or read only memory and executed by processor. This control logic or software may also be resident on an article of manufacture comprising a computer readable medium having computer readable program code embodied therein and being readable by the mass storage device and for causing the processor to operate in accordance with the methods and teachings herein.

The present invention may also be embodied in a handheld or portable device containing a subset of the computer hardware components described above. For example, the handheld device may be configured to contain only the bus, the processor and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

The detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A communication system in communication with a communication device via a network and which automatically provides differing levels of information according to a predetermined social hierarchy, the communication system comprising:
   a memory which stores social templates, each social template corresponding to a unique social signature comprising a first sensor value range and a second sensor value range other than the first sensor value range and each social template being selectable to provide, for each level of the predetermined social hierarchy, a corresponding differing amount of information to each member of the predetermined social hierarchy; and
   a server comprising
      a processor which receives from the communication device sensor data received from a sensor set of the communication device which detects sensor data including a first detected sensor value from a first sensor and a second detected sensor value from a second sensor related to an environment of the communication device, creates a detected social signature from the received sensor data, determines which of the social signatures of the social templates has a greatest correspondence with the created social signature through comparison of the first and second detected sensor values and the first and second sensor value ranges of each stored social template, retrieves from the memory the determined one social template having the greatest correspondence, and provides to at least one member of the predetermined social hierarchy only as much information as allowed based on the retrieved social template; and
      a transceiver which receives the sensor data from the sensor set in the communication device, and provides under the control of the processor to at least one of the member of the predetermined social hierarchy only as much information as allowed based on the retrieved social template,
   wherein:
      the first detected sensor value of the sensor data comprises optical information from an optical sensor of the sensor set which detects an amount of light of the environment of the communication device, and the second detected sensor value of the sensor data comprises acoustic information from an acoustic sensor of the sensor set which detects a sound level of the environment of the communication device, and
      the processor retrieves from the memory the determined one social template having the detected amount of light within the first sensor value range, and the detected sound level within the second sensor value range.

2. The communication system of claim 1, wherein:
   the sensor data comprises a location of the communication device, and movement of the communication device, and
   the processor compares the location with map data to determine a map location of the communication device, and creates the detected social signature to include information on the map location of the communication device, the movement being experienced by the communication device, and the environment of the communication device.

3. The communication system of claim 1, wherein:
   the levels of the social hierarchy of the retrieved social template include:
      a first social hierarchy level which provides one level of information as selected in the retrieved social template,
      a second social hierarchy level which provides another level of information as selected in the retrieved social template, and
      a third social hierarchy level which provides a further level of information as selected in the retrieved social template; and
   the processor determines a level value of each member by comparing the member with members assigned to having the first social hierarchy level, the second social hierarchy level, and the third social hierarchy level, and provides only as much information as allowed by the determined social hierarchy level.

4. The communication system of claim 1, wherein the processor further detects an error between the detected social signature and the social signature of the determined one social template having the greatest correspondence, updates the social signature of the determined one social template to include the detected error in the first and/or second sensor value ranges such that the social signature of the determined one social template incorporates the detected social signature where it is determined that the determined one social template is accurate, and creates a new social template using the detected social signature where it is determined that the determined one social template is not accurate.

5. The communication system of claim 1, wherein the processor automatically determines if an incoming communication from a communication requestor being received through the transceiver is interruptive by, prior to completing the communication, assigning the communication requestor to one of the levels of the social hierarchy, and providing to the communication requestor only as much information as allowed based on the retrieved social template.

6. The communication system of claim 1, wherein, for at least one of the social templates, each level of the social hierarchy corresponds to a corresponding different social networking service, and the processor automatically provides different updates to each of the social networking services as allowed under the social hierarchy as defined in the one social template.

7. The communication system of claim 6, wherein:
   one of the social networking services is for professional networking for a first level of the social hierarchy,
   one of the social networking services is for non-professional networking for a second level of the social hierarchy,
   one of the social networking services is a microblogging service for a third level of the social hierarchy,
   the professional networking, non-professional networking, and microblogging services are different services, and
   the professional networking, non-professional networking, and microblogging services receive corresponding different updates.

8. The communication system of claim 1, wherein, for at least one of the social templates, there is a single level of social hierarchy for a social networking service, and the processor automatically provides an update to the social networking service.

9. The communication system of claim 1, wherein, for at least one of the social templates, there is a single level of social hierarchy for a microblogging service, and the processor automatically provides an update to the microblogging service.

10. The communication system of claim 1, wherein, at least one of the social templates corresponds to an emergency, and when the processor detects an emergency situation from the detected social signature, the processor automatically provides information related to the emergency to predetermined emergency services, friends, and/or family members according to the detected emergency situation.

11. The communication system of claim 1, wherein the processor processes the received sensor data to obtain biometric data of a user of the communication device, creates the detected social signature from the received sensor data and the obtained biometric data, identifies the user according to the obtained biometric data, and retrieves from the memory the determined one social template having the greatest correspondence to the detected social signature for the identified user.

12. The communication system of claim 11, wherein the sensor set comprises an input device of which the user uses to input data, and the processor identifies the user according to a pattern of the user while inputting the data.

13. The communication system of claim 11, wherein the processor identifies the user according to an optical pattern unique to the user and which is detected using the optical sensor.

14. The communication system of claim 11, wherein the sensor set comprises an audio sensor, and the processor identifies the user according to a speech pattern unique to the user and which is detected using the audio sensor.

15. The communication system of claim 1, wherein the sensor set comprises an input device which the user uses to input data, and the processor detects a status of the communication device according to use or non-use of the input device.

16. The communication system of claim 15, wherein the input device comprises a touch screen display including a capacitive sensor, and the processor detects a status of the communication device according to changes in a capacitance detected by the capacitive sensor.

17. The communication system of claim 1, wherein the sensor set comprises an Ultra Wideband sensor which provides ranging data regarding the environment of the communication device, and the processor includes in the social signature a size of the location in which the communication device is found using the provided ranging data.

18. The communication system of claim 1, wherein the sensor data comprises usage data relating to a use of the communication device.

19. A method of automatically providing differing levels of information according to a predetermined social hierarchy, the method comprising:
receiving sensor data at a server from a communication device having a sensor set producing the sensor data including a first detected sensor value from a first sensor and a second detected sensor value from a second sensor related to an environment of the communication device, the first detected sensor value of the sensor data comprising optical information from an optical sensor of the sensor set which detects an amount of light of the environment of the communication device, and the second detected sensor value of the sensor data comprising acoustic information from an acoustic sensor of the sensor set which detects a sound level of the environment of the communication device;
constructing a social signature using the received sensor data;
determining which one of a plurality of social templates has a social signature with a greatest correspondence with the constructed social signature through comparison of the first and second detected sensor values and first and second sensor value ranges of each social template, each social template corresponding to a unique social signature comprising corresponding first and second sensor value ranges and each social template being selectable to provide, for each level of the predetermined social hierarchy, a corresponding differing amount of information to each member of the predetermined social hierarchy; and
retrieving from a memory the determined one social template having the greatest correspondence and having the detected amount of light within the first sensor value range, and the detected sound level within the second sensor value range,
wherein at least one member of the predetermined social hierarchy is provided only as much information as allowed based on the retrieved social template.

20. The method of claim 19, wherein:
the sensor data comprises a location of the communication device, and movement of the communication device, and
the constructing the social signature comprises comparing the location with map data to determine a map location of the communication device, and creating the social signature to include information on the map location of the communication device, the movement being experienced by the communication device, and the environment of the communication device.

21. The method of claim 19, further comprising:
detecting an error between the constructed social signature and the social signature of the determined one social template having the greatest correspondence;
updating the social signature of the determined one social template to include the detected error such that the social signature of the determined one social template incorporates the detected social signature in the first and/or second sensor value ranges where it is determined that the determined one social template is accurate; and
creating a new social template using the detected social signature where it is determined that the determined one social template is not accurate.

22. The method of claim 19, further comprising:
detecting an incoming communication from a communication requestor; and
prior to completing the communication, assigning the communication requestor to one of the levels of the social hierarchy, and providing to the communication requestor only as much information as allowed based on the retrieved social template.

23. The method of claim 19, wherein the information provided by the retrieved social template is an update to a social networking service as allowed based on the retrieved social template.

24. The method of claim 23, wherein the information provided comprises a different update to another social networking service as allowed based on the retrieved social template, the another social networking service being other than the social networking service.

25. The method of claim 24, wherein the information provided comprises an update to a microblogging service as allowed based on the retrieved social template.

26. The method of claim 19, further comprising detecting an emergency situation from the constructed social signature, wherein the information provided comprises information related to the emergency situation and which is selectively to be sent to predetermined emergency services, friends, and/or family members according to the detected emergency situation using one of the social templates.

27. The method of claim 19, further comprising:
obtaining biometric data using the received sensor data; and
identifying a user of the communication device according to the obtained biometric data, wherein the determining comprises determining the one social template having the greatest correspondence for the identified user.

28. The method of claim 19, wherein the sensor data comprises usage data relating to a use of the communication device.

29. The method of claim 19, further comprising:
detecting an error between the constructed social signature and the social signature of the determined one social template having the greatest correspondence;
updating the social signature of the determined one social template to include the detected error such that the social signature of the determined one social template incorporates the detected social signature in the first and/or second sensor value ranges where it is determined that the determined one social template is accurate according to received confirmation information; and
storing the updated social template in the memory.

30. The method of claim 19, further comprising:
detecting an error between the constructed social signature and the social signature of the determined one social template having the greatest correspondence;
creating a new social template using the detected social signature where it is determined that the determined one social template is not accurate according to received confirmation information; and
storing the new social template.

31. The method of claim 19, further comprising:
receiving a request to construct a new social template;
assigning the constructed social signature to the new social template;
assigning a corresponding social hierarchy to the new social template; and
storing the new social template having the assigned social signature and social hierarchy.

32. A non-transitory computer readable medium encoded with processing instructions to implement the method of claim 19 executed by one or more processors.

* * * * *